United States Patent [19]
Murphy

[11] Patent Number: 5,375,180
[45] Date of Patent: Dec. 20, 1994

[54] PROCESS TOLERANT REVERSE DELTA-BETA DIRECTIONAL COUPLER SWITCH AND METHOD OF FABRICATING SAME

[75] Inventor: Edmond J. Murphy, Bethlehem

[73] Assignee: AT&T Corp., Murray Hill, N.J.

[21] Appl. No.: 131,503

[22] Filed: Oct. 4, 1993

[51] Int. Cl.$^5$ .................... G02B 6/12; H01L 21/70
[52] U.S. Cl. ........................ 385/21; 385/16; 385/20; 385/40; 385/41; 385/14; 385/42; 385/131; 437/15; 437/20; 437/50; 437/51; 437/126; 437/141; 437/192
[58] Field of Search ............ 385/1, 2, 8, 9, 11, 385/14, 16, 17, 27, 24, 42, 31, 39, 40, 41, 130, 131, 132; 437/15, 16, 20, 21, 28, 36, 50, 51, 116, 126, 128, 129, 134, 141, 164, 192

[56] References Cited

U.S. PATENT DOCUMENTS

| | | | |
|---|---|---|---|
| 4,211,467 | 7/1980 | Cross et al. | 385/41 X |
| 4,679,893 | 7/1987 | Ramer | 385/16 X |
| 4,763,974 | 8/1988 | Thaniyavarn | 385/41 |
| 4,871,223 | 10/1989 | Auracher et al. | 385/16 X |
| 5,004,447 | 4/1991 | Soref | 385/16 X |
| 5,066,086 | 11/1991 | Angenent et al. | 385/41 |
| 5,103,491 | 4/1992 | Kuzuta | 385/41 X |
| 5,111,517 | 5/1992 | Riviere | 385/41 X |
| 5,146,518 | 9/1992 | Mak et al. | 385/41 |

OTHER PUBLICATIONS

E. J. Murphy, et al, "Low Crosstalk 8×8 Lithium Niobate Switch Array with Uniform Voltages," Optical Fiber Communication Conference, San Jose, Calif., Feb., 1992.
J. E. Watson, et al., "A Low-Voltage 8×8 Ti:LiNbO3 Switch with a Dilated-Benes Architecture," J. Lightwave Tech., vol. 8, p. 794, (1990).
S. S. Bergstein et al., "A Fully Implemented Strictly Non-blocking 16×16 Photonic Switching System, Optional Fiber Communication Conference", postdeadline paper, San Jose, Calif., Feb., 1993.
A. F. Ambrose, et al., "Design and Performance of a Complete Optical Switching System," Photonics in Switching Topical Meeting, postdeadline paper, Palm Springs, Calif., Mar., 1993.
E. J. Murphy and T. O. Murphy, "Characteristics of Twenty-Three Ti:LiNbO3 Switch Arrays for a Guided Wave Photonic Switching System," European Conference on Integrated Optics, Neuchatelk, Switzerland, Apr., 1993.
Chapters 9 and 11 of Miller and Kaminow, "Optical Fiber Telecommunications II" (Academic Press 1988).
H. Kogelnick and R. V. Schmidt, "Switched Directional Couplers with Alternating $\Delta\beta$", IEEE J Quantum Elec., vol. QE-12, p. 396 (1976).
R. V. Schmidt and R. C. Alferness, "Directional Coupler Switches, Modulators and Filters Using Alternating $\Delta\beta$ Techniques," IEEE Trans. on Circuits and Systems, vol. CAS-26, p. 1099 (1979).
J. E. Zucker et al., "Compact Directional Coupler Switches Using Quantum Well Electrorefraction," Appl. Phys. Lett., vol. 55 (1989).

*Primary Examiner*—Brian Healy

[57] ABSTRACT

A three or more section reverse $\Delta\beta$ directional coupler designed to operate at a number of coupling lengths (L/l) selected from a region of a corresponding switching diagram where the cross and bar state switching curves are approximately parallel to each other and to the vertical axis, the vertical axis defining numbers of coupling lengths, or from a region of corresponding process sensitivity plots for the cross and bar states where the cross and bar state voltage curves are both approximately of zero slope. A number of these directional couplers form an optical switching array and a number of arrays form a system or network for switching optical signals each of which are capable of operation with uniform cross and bar state voltages at low crosstalk levels.

70 Claims, 9 Drawing Sheets

PROCESS TOLERANT REVERSE DELTA-BETA DIRECTIONAL COUPLER SWITCH AND METHOD OF FABRICATING SAME

FIELD OF THE INVENTION

The present invention relates generally to optical waveguide switches, and more particularly to reverse $\Delta\beta$ directional couplers.

BACKGROUND OF THE INVENTION

There have been several recent demonstrations of optical switching systems in which integrated arrays of large numbers (i.e., tens to hundreds) of lithium niobate directional couplers were used for telecommunication applications. For example, in one case, a single package was fabricated containing a total of 48 monolithically integrated 2×2 optical waveguide switches connected to form an 8×8 rearrangeably non-blocking dilated Benes network. G. D. Bergland, "A Photonic Time Division Switching Experiment," Photonics in Switching Topical Meeting, paper PWB3, Palm Springs, Cal., March, 1993; E. J. Murphy, et al, "Low Crosstalk 8×8 Lithium Niobate Switch Array with Uniform Voltages," Optical Fiber Communication Conference, San Jose, Cal., February, 1992; and J. E. Watson, et al., "A Low-Voltage 8×8 Ti:LiNbO3 Switch with a Dilated-Benes Architecture," J. Lightwave Tech., vol. 8, p. 794, (1990).

In another case, twenty-three packages containing a total of 448 2×2 optical waveguide switches were interconnected to form a 16×16 strictly non-blocking Extended Generalized Shuffle Network. S. S. Bergstein et al., "A Fully Implemented Strictly Non-blocking 16×16 Photonic Switching System, Optical Fiber Communication Conference, postdeadline paper, San Jose, Calif., February, 1993 ("the Bergstein article"); A. F. Ambrose, et al., "Design and Performance of a Complete Optical Switching System," Photonics in Switching Topical Meeting, postdeadline paper, Palm Springs, Calif., March, 1993 ("the Ambrose article"); and E. J. Murphy and T. O. Murphy, "Characteristics of Twenty-Three Ti:LiNbO3 Switch Arrays for a Guided Wave Photonic Switching System," European Conference on Integrated Optics, Neuchatel, Switzerland, April, 1993 ("the Murphy article").

In each case, the directional couplers were fabricated using a two-section reverse $\Delta\beta$ design. The two-section design uses two sections or pairs of control electrodes covering the waveguides. With this design, each optical switch requires a negative DC bias voltage, $V_{bias}$, to obtain the cross state and a positive switch voltage, $V_{switch}$, which toggles on and off to obtain the straight-through or bar state. The switches are packaged in a dual-in-line configuration with a bias and switch pin for each coupler. In operation, $V_{bias}$ is applied to one electrode of each pair while the other electrode of each pair is held at ground to obtain the cross state or switched to $V_{switch}$ to obtain the bar state. Electronic control boards provide the bias and switching voltages to each of the directional couplers. To maintain low crosstalk levels $V_{bias}$ and $V_{switch}$ must be custom tuned for each coupler, because the two-section design is too sensitive to uncontrollable variations in the fabrication process which, without custom tuning, result in significant crosstalk performance degradation. To custom tune $V_{bias}$ and $V_{switch}$ expensive, custom voltage drivers with programmable potentiometers are used.

Practical applications involving large switch arrays, however, require optical waveguide switches which can be controlled with easily manufactured and inexpensive, generic voltage drivers and uniform or single preset voltages for $V_{bias}$ and $V_{switch}$. One way to accomplish this, but only for certain system architectures, is to improve the overall system crosstalk performance, as opposed to the crosstalk of the two-section design, by "dilating" the architecture. The problems with this approach include the need for additional couplers for each switch in the array to direct the crosstalk away from the path of the optical signal. The resultant increase in the number of couplers, in turn, increases the complexity of the system design and requires additional and/or larger substrates resulting in a costly design.

Manufacture and operation of optical switching arrays would be greatly simplified if uniform or single preset voltages for the cross and bar states could be applied to every optical switch in an optical network or integrated array and low cross-talk levels maintained without having to "dilate" the architecture.

SUMMARY OF THE INVENTION

It is therefore one object of the present invention to greatly simplify manufacture and operation of optical switching networks and integrated arrays of optical switches by designing a fabrication process tolerant coupler which allows uniform or single preset cross and bar state voltages to be applied to every optical switch in a network or individual array while maintaining low cross-talk levels.

It is a further object of the present invention to manufacture optical networks and individual switching arrays with a minimum number of directional couplers which can be operated with uniform cross and bar state voltages at low crosstalk levels.

It is a further object of the present invention to eliminate the need for expensive, custom voltage drivers with programmable potentiometers for tuning the cross and bar state voltages of every switch in an optical network or integrated array and still maintain low crosstalk levels without "dilating" the architecture.

It is a further object of the present invention to fabricate an optical switch which is relatively insensitive to changes in the selected number of coupling lengths, L/l, due to fabrication process variations.

It is a further object of the present invention to significantly broaden fabrication tolerances for integrated arrays of optical switches.

It is still a further object of the present invention to loosen the tolerances on the control voltages, $V_{bias}$ and $V_{switch}$, which the system user must supply to the optical network or integrated array.

The objects of the present invention are achieved by an optical network or integrated array of optical switches made up of a plurality of three or more section reverse $\Delta\beta$ directional couplers which can be driven with uniform cross and bar state voltages at low levels of cross-talk. Each of the directional couplers includes a pair of optical waveguides formed, for example, in a substrate of lithium niobate by titanium diffusion. The optical waveguides of each coupler are closely disposed from each other and generally in parallel in the coupling region (although the gap between them may be tapered). The coupling region of each directional coupler is defined by a number of coupling lengths, L/l, a fabrication dependent ratio, selected from a corresponding switching diagram having cross and bar state switching curves. The switching diagram plots the available numbers of coupling lengths L/l on the vertical axis, and on the horizontal axis, plots the corresponding normalized change in refractive index or phase change $\Delta\beta$ (proportional to the control voltages $V_{bias}$ and $V_{switch}$) necessary to drive the coupler into its cross and bar states.

Three or more pairs of reverse $\Delta\beta$ electrodes are aligned with the pair of waveguides in the coupling region. The electrodes cause an optical signal to cross over between the pair of waveguides in response to a cross state voltage or continue straight through in response to a bar state voltage.

Each directional coupler is designed to operate at a number of coupling lengths in a region of the corresponding switching diagram where the cross and bar state switching curves are approximately in parallel with each other and with the vertical axis of the switching diagram. They are also designed to operate in a region of corresponding cross and bar state process sensitivity plots, having normalized cross and bar state voltages on the vertical axis and corresponding numbers of coupling lengths on the horizontal axis, where the cross and bar state voltage curves are both of approximately zero slope. The operating point of a three-section reverse $\Delta\beta$ directional coupler according to the present invention can be, for example, L/l=3.

By designing optical networks and integrated arrays of optical switches with three or more section reverse $\Delta\beta$ directional couplers to operate at a number of coupling lengths L/l in the above-noted regions, rather than with the prior art two-section devices, the networks and integrated arrays can be driven by generic voltage drivers with uniform cross and bar state voltages at low crosstalk levels without dilating the system architecture, thus simplifying manufacture and operation.

Further advantages of the present invention will be readily apparent from the Detailed Description of the Invention which follows below.

DETAILED DESCRIPTION OF THE INVENTION

I. THE CONVENTIONAL TWO-SECTION REVERSE $\Delta\beta$ COUPLER

Figure 1A:
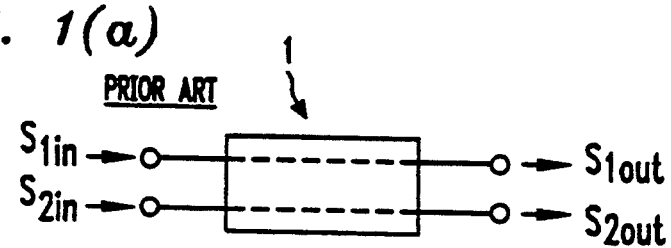
FIGS. 1(a) and (b) is a diagram showing the functional operation of a prior art 2×2 optical waveguide switch.
Figure 1B:
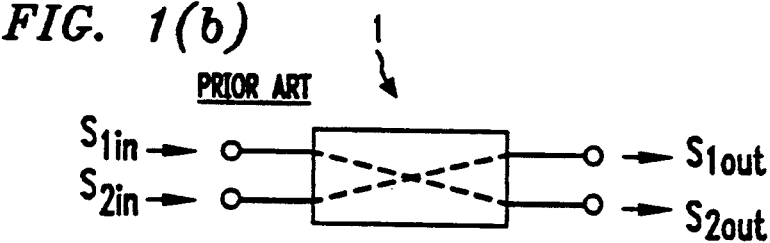

FIG. 1 illustrates an optical switch 1, a basic component of future telecommunications networks throughout the world. As shown in FIG. 1, the optical switch is typically a four-port device with two inputs ($S_{1in}$ and $S_{2in}$), two outputs ($S_{1out}$ and $S_{2out}$), and two switch states, straight-through illustrated in FIG. 1(a) and cross-over illustrated in FIG. 1(b). The optical switch is commonly referred to as a 2×2 optical waveguide switch. In the straight-through state (hereinafter "the bar state"), an optical signal or lightwave entering the top input port $S_{1in}$ exits through the top output port $S_{1out}$. Similarly, an optical signal entering the bottom input port $S_{2in}$ exits through the bottom output port $S_{2out}$. In the cross-over state (hereinafter "the cross state"), an optical signal entering the top port $S_{1in}$ exits through the bottom output port $S_{2out}$ while an optical signal entering the bottom input port $S_{2in}$ crosses over and exits through the top output port $S_{1out}$.

Figure 2:
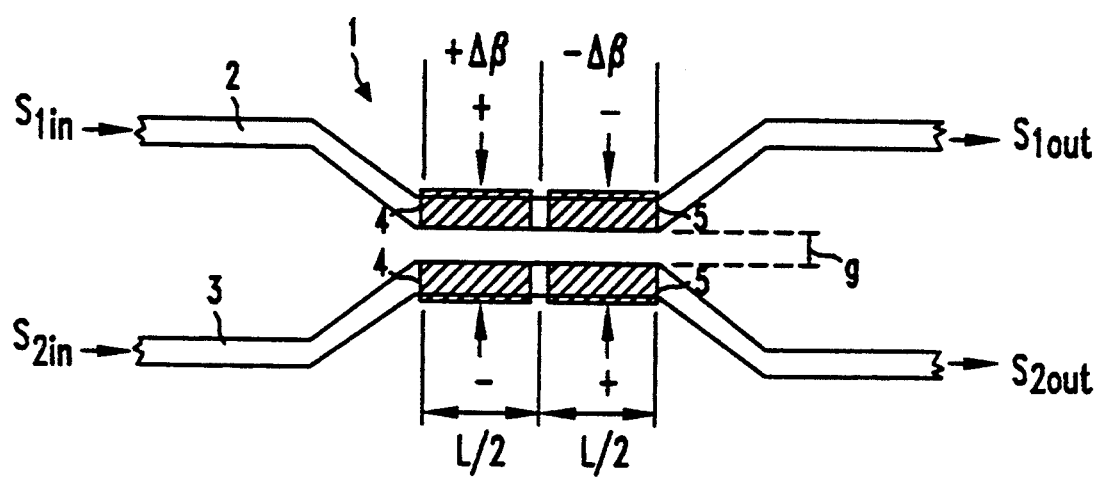
FIG. 2 is a plan view of a prior art two-section reverse $\Delta\beta$ directional coupler.

A directional coupler is an optical waveguide switch formed using two parallel channel waveguides, such as the switch 1, illustrated generally in FIGS. 1(a) and 1(b) and in a specific embodiment in FIG. 2. The directional coupler is characterized by (1) the interaction (or physical) length L, which is the region along the waveguides where inter-waveguide coupling of light occurs (hereinafter "the coupling region"), (2) the coupling coefficient K, which describes the strength of the inter-waveguide coupling, (3) the conversion (or transfer) length $l = \pi/2K$ (hereinafter "the coupling length"), indicating the minimum length required to obtain complete crossover or coupling of an optical signal from one waveguide to the other in the coupling region, and (4) the mismatch $\Delta\beta = \beta_1 - \beta_2$ between the propagation constants $\beta_1$ and $\beta_2$ of the two waveguides representing the change in refractive index of the waveguides. Each switch is designed with a number of coupling lengths, which is defined by the ratio of L/l. For every value of L/l there are corresponding values of $\Delta\beta$ (representing changes in the refractive index of the waveguides) which are required to drive the switch into its cross and bar states. The values of L/l and $\Delta\beta$ for two-section reverse $\Delta\beta$ couplers, for example, are shown in the switching diagrams of FIGS. 3(a) and 3(b) discussed below in detail.

The directional coupler is typically fabricated in a substrate of electro-optic material, such as lithium niobate (LiNbO$_3$). When a voltage is applied to an electro-optic material the optical properties of the material change. This change, called the electro-optic effect, causes a change in the refractive index of the waveguides. A voltage applied through an electrode structure over each of the waveguides induces the required mismatch $\Delta\beta$ or change in the refractive index of the waveguides, corresponding to the L/l value for the device, via the electro-optic effect. Specifically, the applied voltage induces an electric field between the electrodes covering the waveguides which causes the change in the refractive index of the waveguides. By selecting the correct voltages, the changes in the refractive index of the waveguides necessary to effectuate either the cross or bar states of the switch are achieved. There is typically one voltage ("the cross state voltage") which will make the optical signal cross over completely and another voltage ("the bar state voltage") which will make the optical signal go straight through.

In reverse $\Delta\beta$ directional couplers the technique used to achieve the cross or bar states of the switch is to provide an electrode structure along the interaction length L, illustrated in FIG. 2, comprising two or more sections of electrode pairs with a mismatch $\Delta\beta$ of alternating sign induced by applying voltages to the pairs of electrodes in reverse or alternating polarity. One voltage is the bias voltage ($V_{bias}$), a negative voltage, which is applied to the negative electrode of each electrode pair and the other voltage is the switch voltage ($V_{switch}$), a positive voltage, which is applied to the positive electrode of each electrode pair. For a two-section device, $V_{bias}$ will drive the switch into its cross state and $V_{switch}$ will drive the switch into its bar state. This is illustrated by the switching diagram for the two-section device shown in FIGS. 3(a) and 3(b).

FIG. 2 shows a conventional two-section reverse $\Delta\beta$ directional coupler or optical switch 1 having two parallel waveguides 2 and 3 and two pairs of reverse $\Delta\beta$ control electrodes 4 and 5 equally spaced along the coupling region. As mentioned above, this region is defined by the interaction or physical length L over which the waveguides are spaced close enough to each other to permit transfer or coupling of optical signals between them. Typically, the coupling region is also the region over which the waveguides are substantially in parallel, as illustrated in FIG. 2.

Figure 3A:
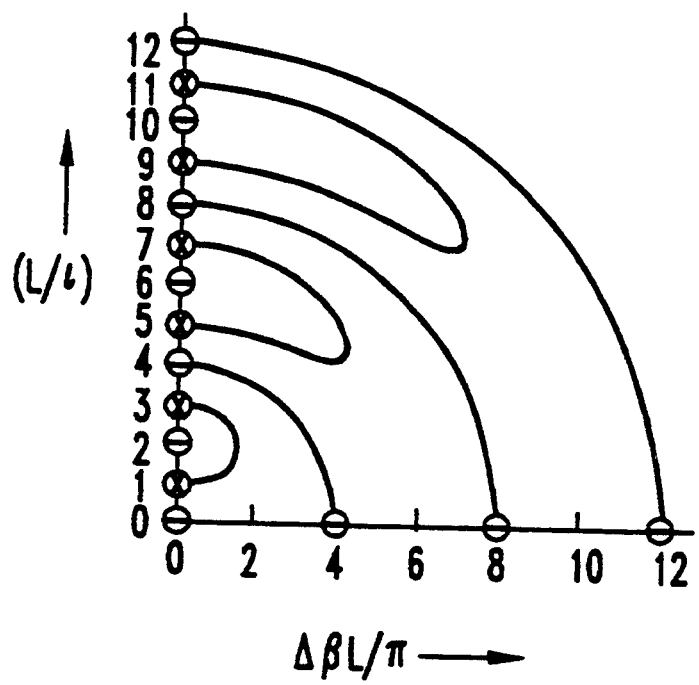
FIG. 3(a) shows the switching curves for a prior art two-section reverse $\Delta\beta$ directional coupler switch.
Figure 3B:
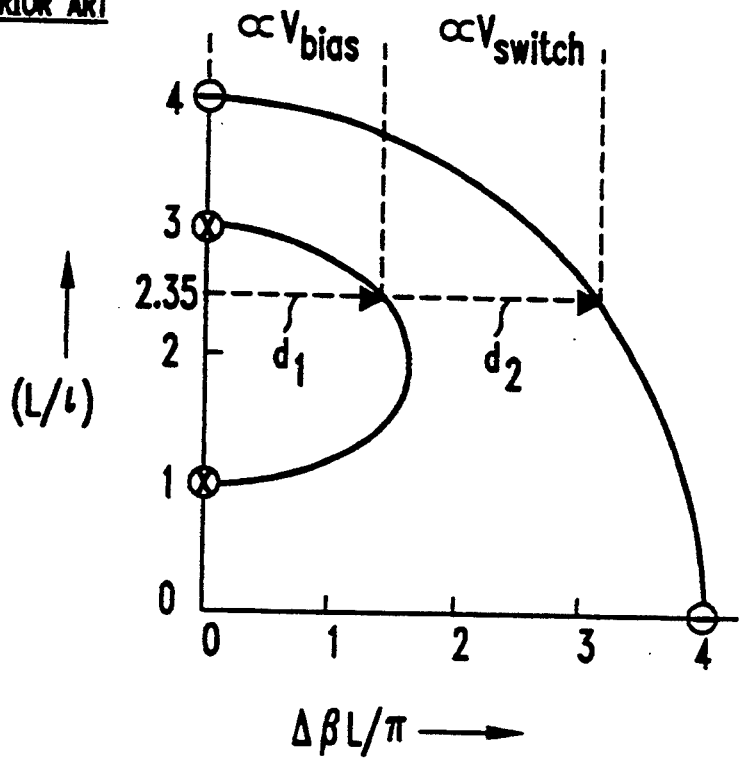
FIG. 3(b) shows an exploded view of the operating region used for conventional two-section reverse $\Delta\beta$ directional couplers.

The switching diagram for a two-section reverse $\Delta\beta$ device is shown in FIG. 3(a). The switching diagram is a plot of the ratio of the interaction or physical length L to the coupling length h versus the normalized phase change ($\Delta\beta L/\pi$). The L/l ratio (or number of coupling lengths) is a design and fabrication process dependent variable which is affected by variations in, for example, coupler gap g, coupler length l, waveguide strip width, dopant concentration and diffusion conditions. The $\Delta\beta$ phase change or change in the refractive index of the waveguides is directly proportional to the voltages, $V_{bias}$ and $V_{switch}$, necessary to switch the two-section coupler into its cross and bar states. The switching curves in FIG. 3(a) show available ranges of L/l and corresponding values of $\Delta\beta L/\pi$ proportional to the control voltages which result in either a cross or bar state. The symbol ⊗ marks the cross state curves and the symbol ⊖ marks the bar state curves. As shown in FIG. 3(b), the value of $V_{bias}$ is proportional to the distance d$_1$ between the vertical axis of the switching diagram ($V_{bias}=0$) and the ⊗ state curve. As also shown in FIG. 3(b), the value of $V_{switch}$, in turn, is proportional to the distance d$_2$ between the ⊗ and ⊖ state curves.

Ideally, each switch in a system is controlled with the same set of voltages, $V_{bias}$ and $V_{switch}$. Inherent changes in the fabrication process and design parameters for L/l from switch to switch in an array, however, result in variations in $\Delta\beta$ and corresponding variations in the control voltages required to drive each two-section device in the array fully into its cross and bar states. The variations in the necessary control voltages with changes in L/l are functions of the slopes of the cross and bar state curves in the selected operating region of the switching diagram shown in FIG. 3(a). Acceptable cross-talk levels constrain the allowable voltage variation which in turn limits the allowable variation in the number of coupling lengths L/l for each switch which is a function of the slope of the ⊗ and ⊖ switching curves. Crosstalk results if the appropriate voltages are not applied to drive the device fully into its cross and bar states. Crosstalk is, for example, the amount of light which couples to waveguide 3 in FIG. 2 when the switch is in its bar state or remains along the waveguide 2 when the switch is in its cross state, i.e., the unswitched signal.

The following chart shows the percentage of unswitched light corresponding to each of a number of different crosstalk levels:

| Percentage of Light | Crosstalk Level |
| --- | --- |
| 50% | −3dB |
| 10% | −10dB |
| 1% | −20dB |
| 0.1% | −30dB |

Acceptable cross-talk levels depend on the application involved, but typically are less than −20 dB. For an application requiring less than −20 dB of crosstalk the allowable voltage variation is typically less than ±10%. For an application requiring less than −10 dB of cross-talk the allowable voltage variation is typically ±20%.

Process control of L/l during fabrication of an integrated array of optical switches is limited to a certain degree, preventing the two-section reverse $\Delta\beta$ switches of the integrated arrays discussed in the Background of the Invention from operating with uniform cross and bar state voltages while maintaining low levels of crosstalk, for example, of less than −20 dB. This is true no matter what region of the two-section switching diagram the switches are designed to operate in.

For example, to minimize $V_{switch}$, the optical switches used in the above-mentioned prior art integrated arrays are designed to operate at L/l approximately equal to 2.35. As a result, as illustrated in exploded view in FIG. 3(b), these switches operate in a region in which the slopes of the cross and bar state curves are similar. When the slopes of the two curves are similar the distance between them remains essentially the same. Because $V_{switch}$ is proportional to the distance d$_2$ between the cross and bar state curves, $V_{switch}$ will remain relatively unchanged despite variations in L/l and $V_{bias}$. Accordingly, as depicted by the slopes of the cross and bar state curves corresponding to L/l=2.35, small changes in fabrication process parameters which affect L/l result in larger changes in the cross-state voltage ($V_{bias}$) than in the bar state voltage ($V_{switch}$).

Typically, during fabrication L/l will vary from L/l=2.35 in a range of more than 2.25-2.45 from switch to switch in the abovementioned integrated arrays, even with a well controlled fabrication process, resulting in a change in $V_{bias}$ of greater than ±10%. Because the acceptable cross-talk level for the switches of the abovementioned arrays is typically less than −20 dB, corresponding to an allowable control voltage variation of ±10%, uniform or single preset voltages cannot be used for $V_{bias}$.

Figure 4A:
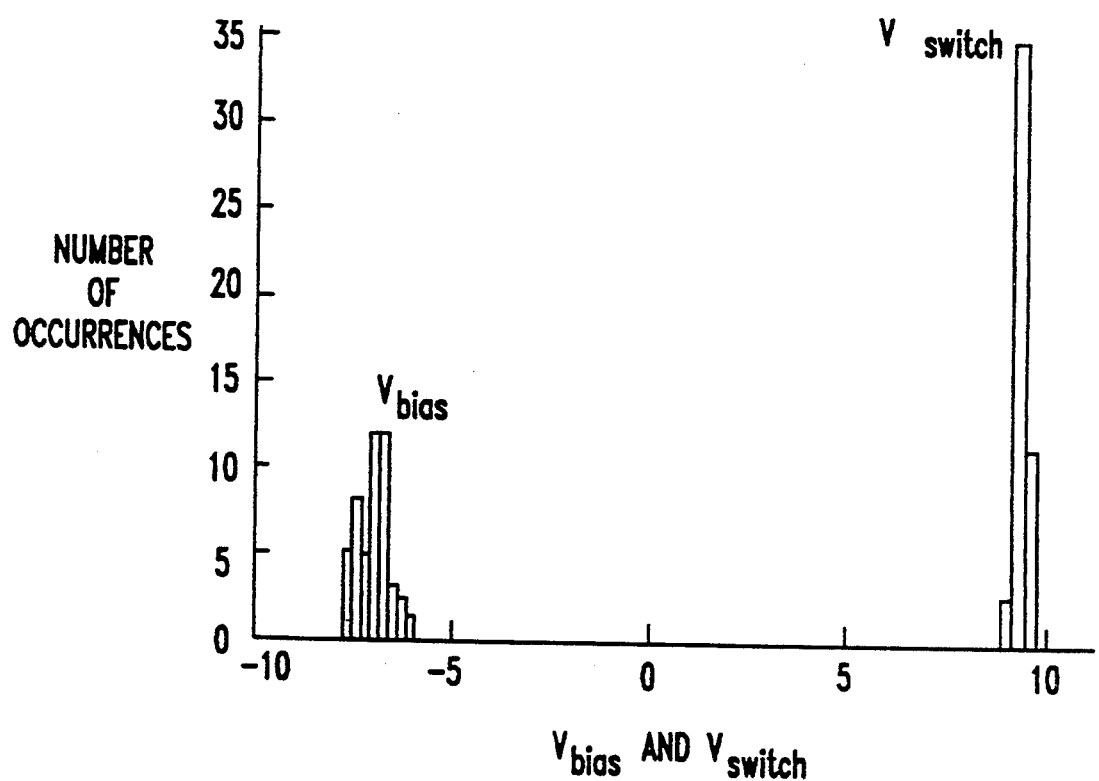
FIG. 4(a) shows a histogram of prior art bias and switching voltages for two-section $\Delta\beta$ switching arrays formed in an 8×8 rearrangeably non-blocking dilated Benes network.
Figure 4B:
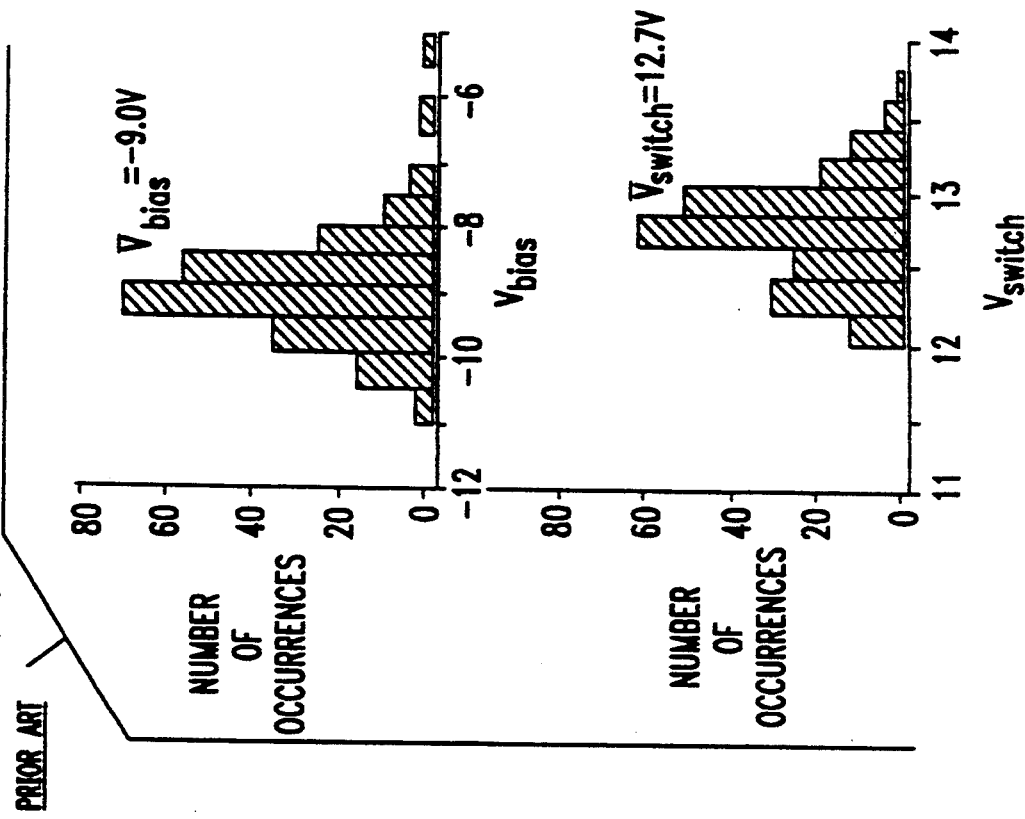
FIG. 4(b) shows the histograms of prior art bias and switching voltages for the input and output stages of two-section reverse $\Delta\beta$ switching arrays formed in a 16×16 strictly non-blocking Extended Generalized Shuffle Network.
Figure 4C:
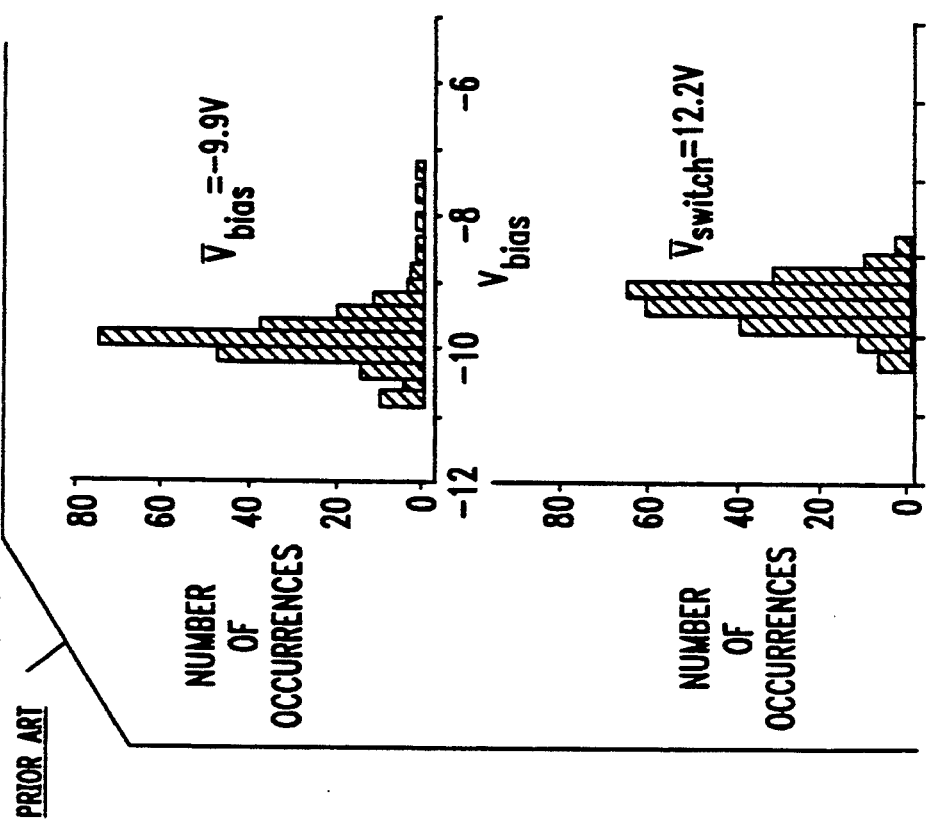
FIG. 4(c) shows the histograms of prior art bias and switching voltages for the center stages of two-section reverse $\Delta\beta$ switching arrays formed in a 16×16 strictly non-blocking Extended Generalized Shuffle Network.

Experimental data for the above-mentioned integrated arrays, shown in FIGS. 4(a), 4(b), and 4(c), illustrates the variations in $V_{bias}$ and $V_{switch}$. FIG. 4(a) shows the histograms of $V_{bias}$ and $V_{switch}$ for the 8×8 rearrangeably non-blocking dilated Benes network. FIGS. 4(b) and (c) show the histograms of $V_{bias}$ and $V_{switch}$ for the input & output and the center stages, respectively, of the 16×16 strictly nonblocking Extended Generalized Shuffle Network.

The histograms for both optical switching systems show that $V_{switch}$ has a much tighter distribution than $V_{bias}$. Although the distributions obtained for $V_{switch}$ in each case are tight enough (<±10%) to allow control of the entire array of optical switches with a single switching voltage, the distribution for $V_{bias}$ in each case is too broad to operate all of the switches with a single voltage without significant crosstalk degradation. Therefore, $V_{bias}$ must be custom tuned for each optical switch so that each switch operates at acceptable levels of cross-talk. This requires, for example, programmable potentiometers in the voltage driver circuits for every optical switch in the array.

Although dilated network architectures with uniform cross and bar state voltages can be used, for example, to reduce the overall crosstalk for an optical switching system to acceptable levels of, for example, less than −20 dB, they are not practical for large switching arrays because dilated architectures require a number of additional couplers in order to implement a standard or undilated architecture. For example, an 8×8 Benes architecture requires approximately 20 directional couplers whereas an 8×8 dilated Benes architecture requires 48 directional couplers. The additional couplers serve to route the crosstalk from the other switching paths away from the signal path of the optical signal.

Figure 5:
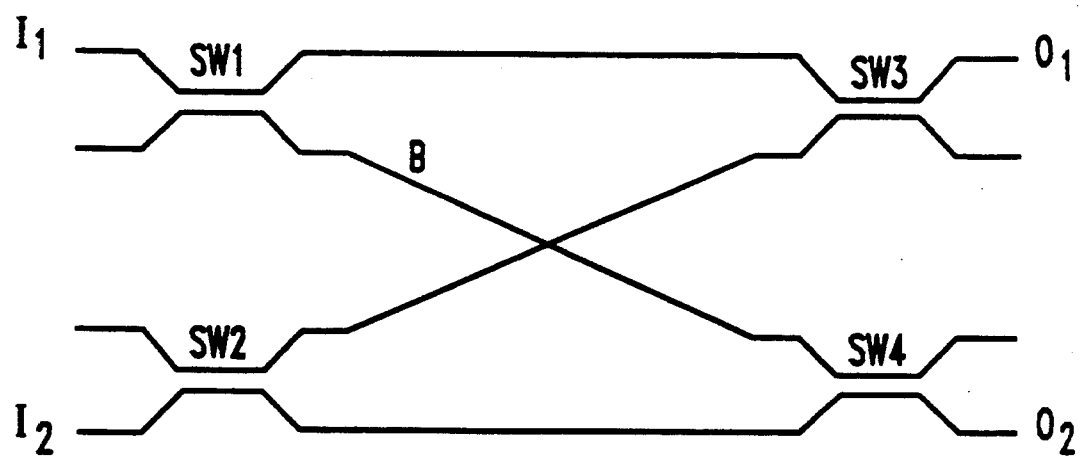
FIG. 5 shows a diagram of a prior art "dilated" 2×2 optical waveguide switch.

The increase in the number of couplers required to dilate an architecture is shown in FIG. 5, by way of example, for a 2×2 switch array. To implement a dilated 2×2 switch four switches SW1-SW4 are used. Assuming all switches are in the bar state, an optical signal entering input $I_1$ would exit through output $O_1$, and an optical signal entering input $I_2$ would exit through output $O_2$. The other inputs and outputs are not used for signal paths, but rather serve to route the crosstalk away. For example, the crosstalk from the optical signal in switch SW1 would end up on waveguide B which routes the crosstalk to the upper input of switch SW4. Because switch SW4 is in the bar state, the crosstalk light goes through the unused port of switch SW4. Some of the crosstalk light, however, will cross over to and exit through output $O_2$ due to the nonperfect operation of the switch. Assuming that all switches have 10% crosstalk, then 10% of the optical signal entering input $I_1$ will end up on waveguide B but only 10% of the crosstalk light on waveguide B will exit through output $O_2$. 10% of 10% is 1%. Thus, the overall system crosstalk is 1% (or −20 dB) instead of 10% (or −10 dB). The additional number of couplers needed to dilate the architecture, however, requires, among other things, larger or additional substrates, is more costly to manufacture, and adds unnecessary complexity to the mask design and to system manufacture and operation. The present invention improves the crosstalk for each coupler and for the network or integrated array as well, without dilating the architecture.

II. THREE OR MORE SECTION REVERSE Δβ COUPLER

The present invention is described with reference to the remaining drawings, FIGS. 6–9.

Figure 6:
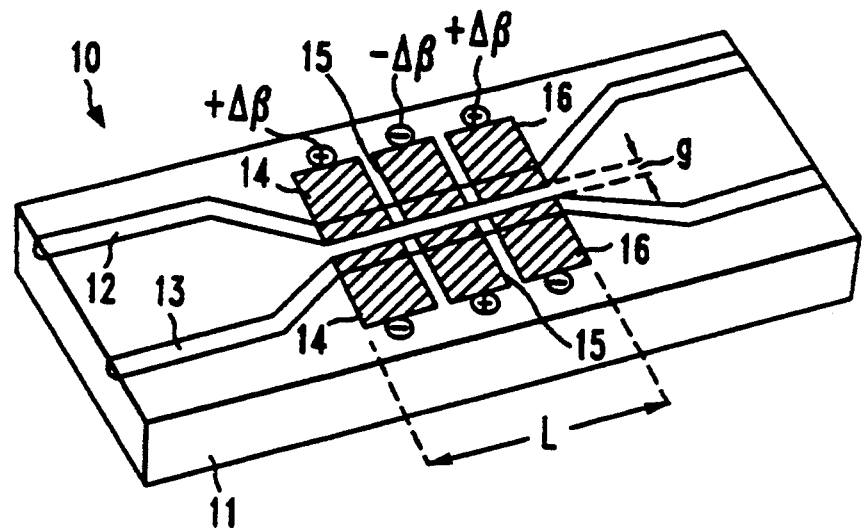
FIG. 6 is a simplified perspective view of a three-section reverse $\Delta\beta$ directional coupler according to the present invention.

FIG. 6 shows a three-section reverse Δβ directional coupler according to the present invention. The coupler 10 is an electro-optic device formed in or on a substrate 11 of electro-optic material. Information on conventional methods of and materials for fabricating a directional coupler can be found in Chapters 9 and 11 of Miller and Kaminow, "Optical Fiber Telecommunications II" (Academic Press 1988) (hereinafter "Miller and Kaminow"), and Zucker et al, "Compact Directional Coupler Switches Using Quantum Well Electro-Refraction," Appl. Phys. Lett., vol. 55, pp. 2280–2282 (1989), incorporated by reference herein. The electro-optic material is preferably lithium niobate, but other materials can be used, including, for example, InP, LiTaO$_3$, InGaAsP and GaAlAs as discussed in chapters 9 and 11 of Miller and Kaminow.

Two optical waveguides 12 and 13 are formed by titanium diffusion or other suitable doping process in or on the electro-optic material. Typical dimensions for the waveguides are 1 to 10 microns in depth and width. The waveguides 12 and 13 are in parallel in the coupling region defined by the interaction length L, typically from 0.2 to 40 mm, and are spaced apart from each other in the coupling region by a distance g (or coupling gap). The waveguides are not constrained to a parallel formation, but they must be close enough so that light can be transferred (or coupled) between them. Typically, the distance g is from 1 to 15 microns.

On the upper surface of the substrate 11, above the parallel waveguides 12 and 13, in the coupling region, a dielectric layer, such as SiO$_2$, is deposited and an electrode structure is formed using well known thin film deposition techniques and photolithography. The electrode structure comprises three-sections of electrode pairs 14, 15, and 16 to which $V_{bias}$ and $V_{switch}$ are applied to operate the switch in its cross and bar states. The + and − designations adjacent the ends of the electrode pairs 14, 15 and 16 indicate a reversal in electric field between adjacent sections. For the three-section device, $V_{bias}$ drives the switch into its bar state, as opposed to the cross state in the case of a two-section device, and $V_{switch}$ drives the device into its cross state.

Figure 7:
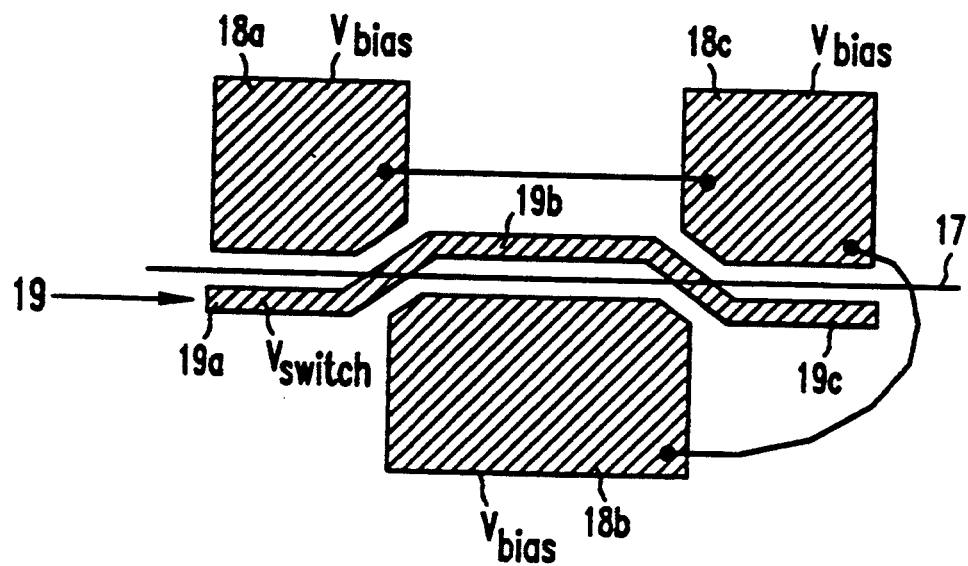
FIG. 7 is a plan view of an alternative three-section $\Delta\beta$ electrode structure for the directional coupler of FIG. 6.

Although the electrodes are shown separated from each other and of equal length, they are not so limited. For example, an alternative three-section reverse Δβ electrode structure is shown in FIG. 7, wherein the center electrode 19, comprising portions 19a, 19b, and 19c, moves from one side of the center of the coupler to the other along the length of the waveguides. The three electrode pairs 18a and 19a, 18b and 19b, and 18c and 19c correspond to the three electrode pairs 14, 15, and 16 shown in FIG. 6. In operation, $V_{bias}$ is applied to electrodes 18a, 18b, and 18c and $V_{switch}$ is applied to the center electrode 19. The center electrode portions 19a and 19c cover waveguide 13 and the center electrode portion 19b covers waveguide 12. This has the effect of reversing the sign of the applied field. The alternative structure shown in FIG. 7 is presently the preferred electrode structure. This preferred structure is also not limited to the equal length electrodes shown.

Figure 8A:
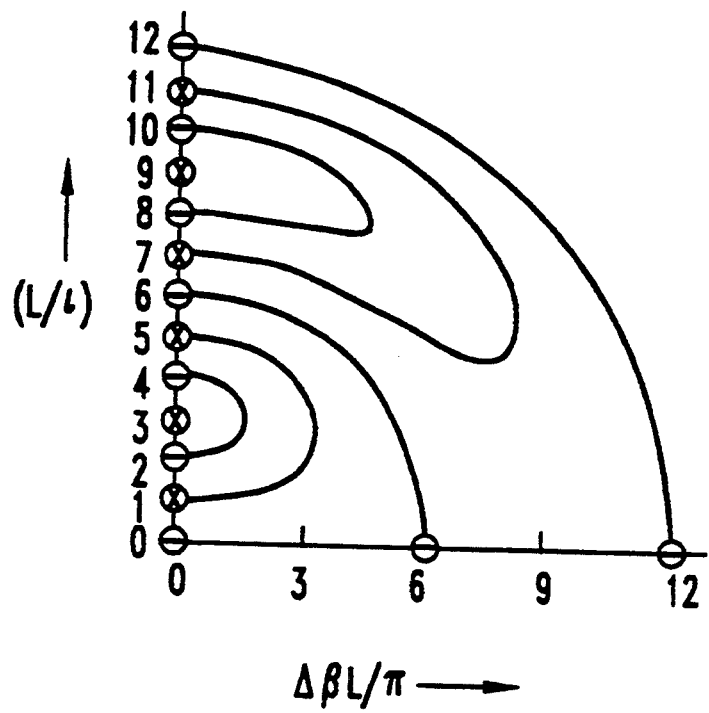
FIG. 8(a) shows the switching curves for a three-section reverse $\Delta\beta$ directional coupler switch according to the present invention.
Figure 8B:
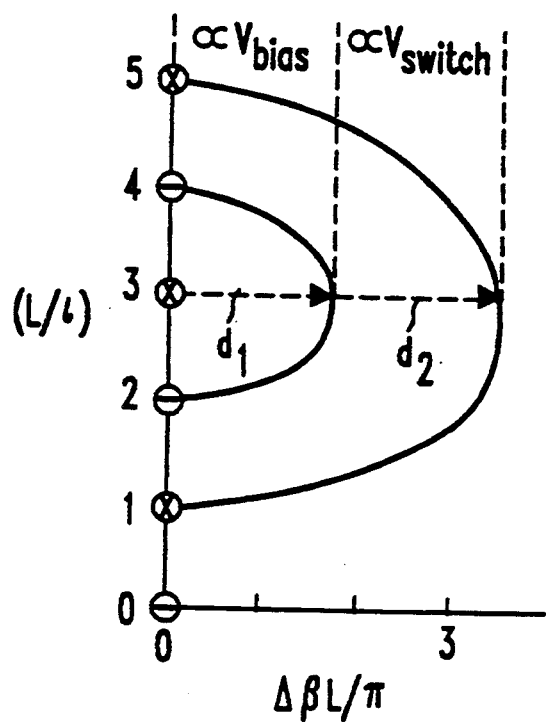
FIG. 8(b) shows an exploded view of the operating region of a three-section device according to the present invention.

FIGS. 8(a) and 8(b) show the theoretical switching curves for a three-section reverse $\Delta\beta$ directional coupler using electrode configurations such as those shown in FIGS. 6 and 7. When operating in accordance with the present invention, namely in a region of the switching diagram, as shown in exploded view in FIG. 8(b), where the cross and bar state curves are approximately in parallel with each other and with the vertical axis of the switching diagram, for example, near L/l=3, both $V_{bias}$ and $V_{switch}$ are insensitive to variations in L/l resulting in low cross-talk levels of, for example, less than −20 db. In this region, both $d_1$ and $d_2$ remain relatively constant over a range of values of L/l.

Figure 9A:
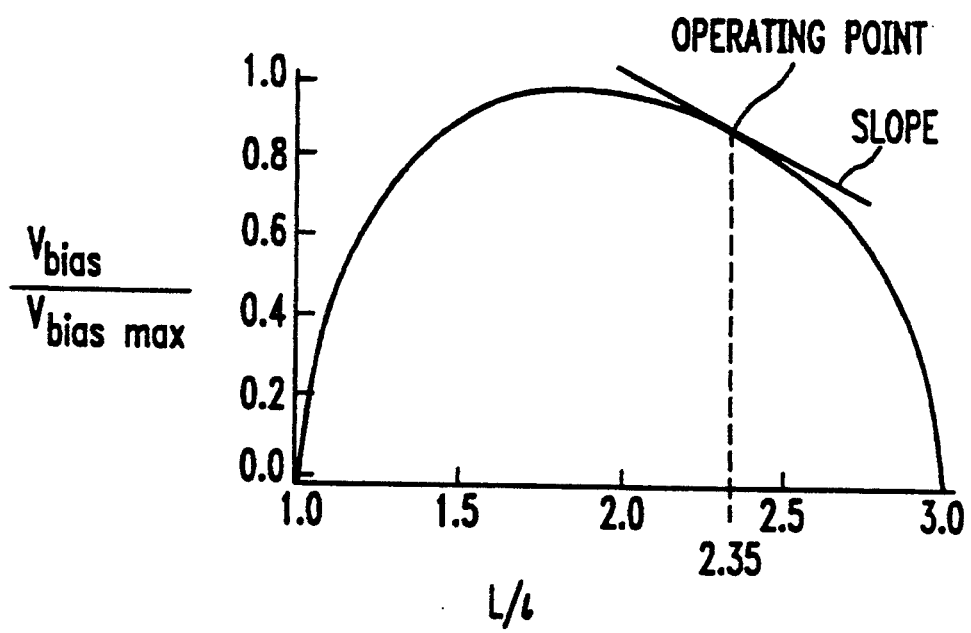
FIGS. 9(a)–9(d) show the process sensitivity plots for two and three-section reversed $\Delta\beta$ couplers which show changes in normalized voltage for the cross and bar states of each device as functions of changes in L/l.
Figure 9B:
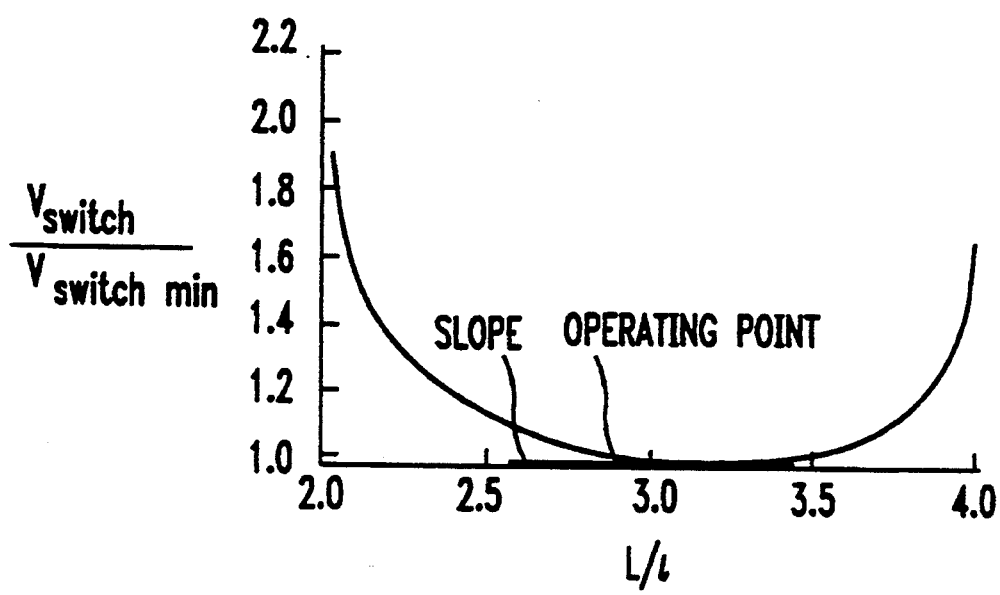
Figure 9C:
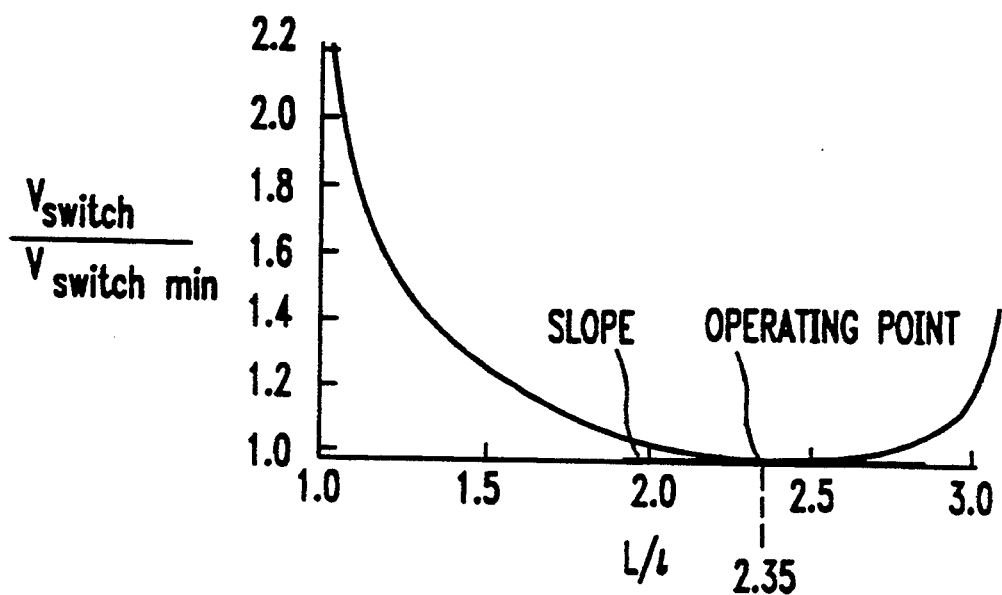
Figure 9D:
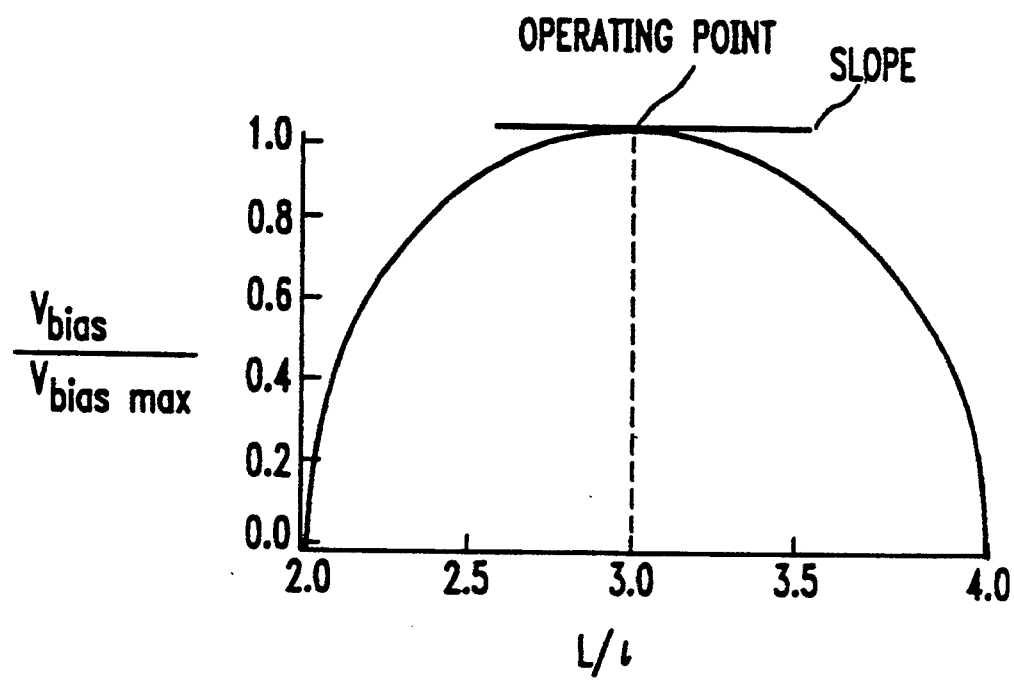

This insensitivity is also illustrated in FIGS. 9(b) and 9(d) which show the normalized cross and bar state voltages, $V_{switch}$ and $V_{bias}$, as a function of L/l for the three-section reverse $\Delta\beta$ design (hereinafter "the cross and bar state voltage curves"). Since the variation in $V_{switch}$ for the three-section device shown in FIG. 9(b), due to changes in L/l, is the same at the operating point as that shown for $V_{bias}$ in FIG. 9(d), i.e., both the cross and bar state voltage curves are of approximately zero slope, one can expect to have a tight enough distribution (less than ±10%) for both the cross and bar state voltages so that the three-section reverse $\Delta\beta$ design can maintain low cross-talk levels despite fabrication variations in L/l from switch to switch in an array. By contrast, for the two-section prior art design shown in FIGS. 9(a) and 9(c), while $V_{switch}$ in FIG. 9(c) is relatively insensitive to variations in L/l, $V_{bias}$ in FIG. 9(a) is not.

Turning back to the switching diagram for the two-section device in FIG. 3(b), by changing the two-section reverse $\Delta\beta$ operating point to L/l=2, the sensitivity of the cross state voltage $V_{bias}$ to process changes could be reduced but at the expense of higher switching voltages, i.e., an increase in $d_1$, and more importantly, increased sensitivity of the switching voltage $V_{switch}$ to process variations, i.e., changes in $d_2$ with changes in L/l, resulting in unacceptable levels of cross-talk for the bar state. This is because the switching diagram for the two-section reverse $\Delta\beta$ coupler does not have a region where the cross and bar state switching curves are both approximately parallel to each other and the vertical axis as shown in FIG. 3(b), or a region on the process sensitivity plots where both the cross and bar state voltage curves are approximately of zero slope at the operating point as shown in FIGS. 9(a) and 9(c).

The following table illustrates the improved tolerance of the three-section device designed to operate in accordance with the present invention by showing the theoretical allowed range of L/l for a given allowed total variation of the control voltages, corresponding to cross-talk levels of less than −10 dB and less than −20 dB, for the cross and bar states of the two and three section designs.

| Allowed Crosstalk | Allowed Voltage Variation | Cross State | | Bar State | |
|---|---|---|---|---|---|
| | | 2-Section | 3-Section | 2-Section | 3-Section |
| <−20 dB | ±10% | 2.25–2.45 | 2.5–3.4 | 1.8–2.8 | 2.6–3.7 |
| | | (.2) | (.9) | (1.0) | (1.1) |
| <−10 dB | ±20% | 2–2.5 | 2.4–3.6 | 1.5–2.9 | 2.4–3.9 |
| | | (.5) | (1.2) | (1.4) | (1.5) |

The above table is exemplary only. The current experimental data for the two-section device shown in FIGS. 4(a), (b), and (c) matches the theoretical calculations above. The exact values, however, may vary from application to application or switch design to switch design. In addition, consistent with these theoretical values, experimental results on three-section reverse $\Delta\beta$ devices with intentional variations in L/l from an operating point of L/l=3 show less than ±10% voltage variations for L/l variations of up to ±0.4, i.e., in the range of 2.6 to 3.4. For a two-section reverse $\Delta\beta$ device, a similar ±0.4 variation from an operating point of L/l=2.35 would have resulted in cross state voltage ($V_{bias}$) changes of up to +12% and −35% resulting in unacceptable levels of cross-talk.

In the case of a two-section device, because L/l varies during fabrication of the array over a range exceeding 2.25–2.45, uniform voltages cannot be used for the cross state voltage. In the case of a three-section device, because L/l does not vary during fabrication by more than 2.6–3.4, uniform voltages can be used for both the cross and bar state voltages.

The three-section reverse $\Delta\beta$ directional coupler when designed to operate in accordance with the present invention is thus process tolerant, and therefore can be operated with uniform or single preset voltages for both the cross and bar states which in turn can be controlled with easily manufactured, inexpensive generic voltage drivers, while maintaining low crosstalk levels, without dilating the architecture. The need for programmable potentiometers in the voltage driver circuits for custom tuning each switch in the array is no longer necessary.

The use of a three-section reverse $\Delta\beta$ design according to the present invention also has two other advantages. First, the switching voltage $V_{switch}$ is approximately 8% lower than obtained in the two-section case. This results in lower switching energy and potentially faster switching speed. Second, for a coupler with the same interaction length, L, the three-section case requires a coupler with a smaller coupling or transfer length, l. More specifically, equation 6 from the Kogelnick reference (discussed below) relates the coupling length of the inter-waveguide spacing g as follows: $l = l_0 \exp(g/\gamma)$, where $l_0$ and $\gamma$ are process dependent parameters. Interwaveguide spacing must decrease to obtain smaller coupling lengths. Differentiation results in the following equation:

$$\frac{dl}{dg} = \frac{l_0}{\gamma} \exp(g/\gamma)$$

from which it is clear that smaller gaps result in smaller variations of the coupling length l due to variations in the coupler gap g during fabrication.

The present invention is not limited, however, to three-section reverse $\Delta\beta$ directional coupler operated in the above-identified region, but applies to couplers with any multiple of reverse $\Delta\beta$ sections greater than two in number which are operated in a region of their corresponding switching diagrams where the cross and bar state switching curves are approximately in parallel with each other and the vertical axis or in a region of their corresponding process sensitivity plots where the cross and bar state voltage curves are both approximately of zero slope.

Information on the structure and switching diagrams for couplers with reverse $\Delta\beta$ sections greater than three can be found in H. Kogelnick and R. V. Schmidt, "Switched Directional Couplers with Alternating $\Delta\beta$", IEEE J Quantum Elec., vol. QE-12, p. 396, (1976) ("the Kogelnick reference") and R. V. Schmidt and R. C. Alferness, "Directional Coupler Switches, Modulators and Filters Using Alternating $\Delta\beta$ Techniques," IEEE Trans. on Circuits and Systems, vol. CAS-26, p. 1099 (1979) ("the Alferness article"), which are incorporated by reference herein.

For example, FIG. 8 of the Kogelnick reference shows the switching diagram for a directional coupler using four sections of reverse $\Delta\beta$ and FIG. 13 of the Alferness article shows the switching diagram for a six section reverse $\Delta\beta$ device. Switch arrays using either device can be controlled with uniform cross and bar state voltages if an L/l is chosen from the region where the cross and bar state curves are approximately parallel to each other and to the vertical axis.

In addition, the present invention is not limited to optical switches having two active inputs and two active outputs, but includes other switch configurations such as the coupled waveguide interferometers discussed in U.S. Pat. No. 4,763,974 to Thaniyavarn. The coupled waveguide interferometers discussed therein have one active input and one active output.

The present invention can also be used with polarization independent or dual polarization directional couplers, in addition to the single polarization devices discussed above, if proper fabrication conditions are chosen and the electro-optic material is properly oriented so that the same L/l values and voltage-induced changes in refractive index occur for both polarizations.

Various changes and modifications of the present invention will be readily apparent to those of ordinary skill in the art, and all such changes and modifications are considered to fall within the scope of the invention as defined by the appended claims.

What is claimed is:

1. An optical waveguide switch comprising:
   first and second optical waveguides formed in or on a substrate of electro-optic material, said first and second optical waveguides being closely disposed to each other in a coupling region having a number of coupling lengths selected from a corresponding switching diagram having cross and bar state switching curves, said switching diagram having a first axis corresponding to numbers of coupling lengths and a second axis proportional to cross and bar state voltages, said number of coupling lengths selected from a region of the switching diagram where the cross and bar state switching curves are approximately in parallel with each other and with the first axis of the switching diagram corresponding to the numbers of coupling lengths, and
   at least three pairs of reverse $\Delta\beta$ electrodes in the coupling region for switching said first and second optical waveguides to a cross state in response to a cross state voltage and a bar state in response to a bar state voltage.

2. The optical switch of claim 1, wherein the substrate is formed from lithium niobate.

3. The optical switch of claim 2, wherein the waveguides are formed in the substrate by titanium diffusion.

4. The optical switch of claim 1, wherein the waveguides are in parallel in the coupling region.

5. The optical switch of claim 1, wherein the electrodes are formed on an upper surface of the substrate using suitable thin film deposition techniques and photolithography.

6. The optical switch of claim 1, wherein the electrodes are formed on a dielectric film on the substrate using suitable thin film deposition techniques and photolithography.

7. The optical switch of claim 6, wherein the dielectric film is $SiO_2$.

8. The optical switch of claim 1, wherein the electrodes are of equal length, are equally spaced, and are aligned to the waveguides in the coupling region.

9. The optical switch of claim 1, wherein the optical switch is a three-section reverse $\Delta\beta$ directional coupler.

10. The optical switch of claim 9, wherein the number of coupling lengths is approximately 3.

11. The optical switch of claim 10, wherein there are three pairs of reverse $\Delta\beta$ electrodes, a first, second, and third pair, each pair comprising first and second electrodes, the second electrode of each pair integrally formed as a center electrode, said center electrode moving from a position covering said second waveguide and in operable alignment with said first electrode of said first pair to a second position covering said first waveguide and in operable alignment with said first electrode of said second pair and to a position covering said second waveguide and in operable alignment with said first electrode of said third pair.

12. The optical switch of claim 1, wherein the optical switch is a one-input/one-output coupled waveguide interferometer.

13. The optical switch of claim 1, wherein the optical switch is a polarization independent directional coupler.

14. An optical waveguide switch comprising:
   first and second optical waveguides formed in or on a substrate of electro-optic material, said first and second optical waveguides being closely disposed to each other in a coupling region having a number of coupling lengths, said number of coupling lengths selected from a region of corresponding process sensitivity plots, having cross and bar state voltage curves, where the cross and bar state voltage curves are both of approximately zero slope, and
   at least three pairs of reverse $\Delta\beta$ electrodes in the coupling region for switching said first and second optical waveguides to a cross state in response to a cross state voltage and a bar state in response to a bar state voltage.

15. The optical switch of claim 14, wherein the substrate is formed from lithium niobate.

16. The optical switch of claim 15, wherein the waveguides are formed in the substrate by titanium diffusion.

17. The optical switch of claim 14, wherein the waveguides are in parallel in the coupling region.

18. The optical switch of claim 14, wherein the electrodes are formed on the upper surface of the substrate using suitable thin film deposition techniques and photolithography.

19. The optical switch of claim 14, wherein the electrodes are formed on a dielectric film on the substrate using suitable thin film deposition techniques and photolithography.

20. The optical switch of claim 19, wherein the dielectric film is $SiO_2$.

21. The optical switch of claim 14, wherein the electrodes are of equal length, are equally spaced, and are aligned to the waveguides in the coupling region.

22. The optical switch of claim 14, wherein the optical switch is a three-section reverse $\Delta\beta$ directional coupler.

23. The optical switch of claim 22, wherein the number of coupling lengths is approximately 3.

24. The optical switch of claim 23, wherein there are three pairs of reverse $\Delta\beta$ electrodes, a first, second, and third pair, each pair comprising first and second electrodes, the second electrode of each pair integrally formed as a center electrode, said center electrode moving from a position covering said second waveguide and in operable alignment with said first electrode of said first pair to a second position covering said first waveguide and in operable alignment with said first electrode of said second pair and to a position covering said second waveguide and in operable alignment with said first electrode of said third pair.

25. The optical switch of claim 14, wherein the optical switch is a one-input/one-output coupled waveguide interferometer.

26. The optical switch of claim 14, wherein the optical switch is a polarization independent coupler.

27. An optical waveguide switch comprising:
means for propagating an optical signal from one or more inputs to one or more outputs having a coupling region of a number of coupling lengths selected from a corresponding switching diagram having cross and bar state switching curves, said switching diagram having a first axis corresponding to numbers of coupling lengths and a second axis proportional to cross and bar state voltages, said number of coupling lengths selected from a region of the switching diagram where said cross and bar state switching curves are approximately in parallel with each other and with the first axis of the switching diagram corresponding to the numbers of coupling lengths, and
means for coupling said optical signal between each of said one or more inputs and outputs in response to cross and bar state voltages.

28. The optical switch of claim 27, wherein the means for propagating an optical signal includes first and second optical waveguides formed by titanium diffusion in a substrate of lithium niobate, said first and second optical waveguides in parallel and closely disposed to each other in said coupling region.

29. The optical switch of claim 27, wherein the means for coupling includes at least three pairs of reverse $\Delta\beta$ electrodes in the coupling region for switching said first and second optical waveguides to a cross state in response to a cross state voltage and a bar state in response to a bar state voltage.

30. The optical switch of claim 27, wherein said optical switch is a three-section reverse $\Delta\beta$ directional coupler.

31. The optical switch of claim 30, wherein the number of coupling lengths is approximately 3.

32. An optical switch comprising:
means for propagating an optical signal from one or more inputs to one or more outputs having a coupling region of a number of coupling lengths, said number of coupling lengths selected from a region of corresponding process sensitivity plots, having cross and bar state voltage curves, where the cross and bar state voltage curves are both of approximately zero slope, and
means for coupling said optical signal between each of said one or more inputs and outputs in response to cross and bar state voltages.

33. The optical switch of claim 32, wherein the means for propagating an optical signal includes first and second optical waveguides formed by titanium diffusion in a substrate of lithium niobate, said first and second optical waveguides in parallel and closely disposed to each other in said coupling region.

34. The optical switch of claim 32, wherein the means for coupling includes at least three pairs of reverse $\Delta\beta$ electrodes in the coupling region for switching said first and second optical waveguides to a cross state in response to a cross state voltage and a bar state in response to a bar state voltage.

35. The optical switch of claim 32, wherein said optical switch is a three-section reverse $\Delta\beta$ directional coupler.

36. The optical switch of claim 35, wherein the number of coupling lengths is approximately 3.

37. An optical switching array capable of operation with uniform cross and bar state voltages at low crosstalk levels comprising a plurality of directional couplers, wherein each of said directional couplers includes:
first and second optical waveguides formed in or on a substrate of electro-optic material, said first and second optical waveguides being closely disposed to each other in a coupling region having a number of coupling lengths selected from a corresponding switching diagram having cross and bar state switching curves, said switching diagram having a first axis corresponding to numbers of coupling lengths and a second axis proportional to cross and bar state voltages, said number of coupling lengths selected from a region of the switching diagram where the cross and bar state switching curves are approximately in parallel with each other and with the first axis of the switching diagram corresponding to the numbers of coupling lengths, and
at least three pairs of reverse $\Delta\beta$ electrodes in the coupling region for switching said first and second optical waveguides to a cross state in response to a cross state voltage and a bar state in response to a bar state voltage.

38. An optical switching array capable of operation with uniform cross and bar state voltages at low crosstalk levels comprising a plurality of directional couplers, wherein each of said directional couplers includes:
first and second optical waveguides formed in or on a substrate of electro-optic material, said first and second optical waveguides being closely disposed to each other in a coupling region having a number of coupling lengths, said number of coupling lengths selected from a region of corresponding process sensitivity plots, having cross and bar state voltage curves, where the cross and bar state voltage curves are both of approximately zero slope, and
at least three pairs of reverse $\Delta\beta$ electrodes in the coupling region for switching said first and second optical waveguides to a cross state in response to a cross state voltage and a bar state in response to a bar state voltage.

39. An optical switching array capable of operation with uniform cross and bar state voltages at low crosstalk levels comprising a plurality of directional couplers, wherein each of said directional couplers includes:
   means for propagating an optical signal from one or more inputs to one or more outputs having a coupling region of a number of coupling lengths selected from a corresponding switching diagram having cross and bar state switching curves, said switching diagram having a first axis corresponding to numbers of coupling lengths and a second axis corresponding to cross and bar state voltages, said number of coupling lengths selected from a region of the switching diagram where said cross and bar state switching curves are approximately in parallel with each other and with the first axis of the switching diagram corresponding to the numbers of coupling lengths, and
   means for coupling said optical signal between each of said one or more inputs and outputs in response to cross and bar state voltages.

40. An optical switching array capable of operation with uniform cross and bar state voltages at low crosstalk levels comprising a plurality of directional couplers, wherein each of said directional couplers includes:
   means for propagating an optical signal from one or more inputs to one or more outputs having a coupling region of a number of coupling lengths, said number of coupling lengths selected from a region of corresponding process sensitivity plots, having cross and bar state voltage curves, where the cross and bar state voltage curves are both of approximately zero slope, and
   means for coupling said optical signal between each of said one or more inputs and outputs in response to cross and bar state voltages.

41. A system for switching optical signals capable of operation with uniform cross and bar state voltages at low crosstalk levels comprising a plurality of optical switching arrays, each of said arrays having a plurality of directional couplers, wherein each of said directional couplers includes:
   first and second optical waveguides formed in or on a substrate of electro-optic material, said first and second optical waveguides being closely disposed to each other in a coupling region having a number of coupling lengths, said number of coupling lengths selected from a region of corresponding process sensitivity plots, having cross and bar state voltage curves, where the cross and bar state voltage curves are both of approximately zero slope, and
   at least three pairs of reverse $\Delta\beta$ electrodes in the coupling region for switching said first and second optical waveguides to a cross state in response to a cross state voltage and a bar state in response to a bar state voltage.

42. A system for switching optical signals capable of operation with uniform cross and bar state voltages at low crosstalk levels comprising a plurality of optical switching arrays, each of said arrays having a plurality of directional couplers, wherein each of said directional couplers includes:
   means for propagating an optical signal from one or more inputs to one or more outputs having a coupling region of a number of coupling lengths selected from a corresponding switching diagram having cross and bar state switching curves, said switching diagram having a first axis corresponding to numbers of coupling lengths and a second axis proportional to cross and bar state voltages, said number of coupling lengths selected from a region of the switching diagram where said cross and bar state switching curves are approximately in parallel with each other and with the first axis of the switching diagram corresponding to the numbers of coupling lengths, and
   means for coupling said optical signal between each of said one or more inputs and outputs in response to cross and bar state voltages.

43. A system for switching optical signals capable of operation with uniform cross and bar state voltages at low crosstalk levels comprising a plurality of optical switching arrays, each of said arrays having a plurality of directional couplers, wherein each of said directional couplers includes:
   means for propagating an optical signal from one or more inputs to one or more outputs having a coupling region of a number of coupling lengths, said number of coupling lengths selected from a region of corresponding process sensitivity plots, having cross and bar state voltage curves, where the cross and bar state voltage curves are both of approximately zero slope, and
   means for coupling said optical signal between each of said one or more inputs and outputs in response to cross and bar state voltages.

44. A system for switching optical signals capable of operation with uniform cross and bar state voltages at low crosstalk levels comprising a plurality of optical switching arrays, each of said arrays having a plurality of directional couplers, wherein each of said directional couplers includes:
   first and second optical waveguides formed in or on a substrate of electro-optic material, said first and second optical waveguides being closely disposed to each other in a coupling region having a number of coupling lengths selected from a corresponding switching diagram having cross and bar state switching curves, said switching diagram having a first axis corresponding to numbers of coupling lengths and a second axis proportional to cross and bar state voltages, said number of coupling lengths selected from a region of the switching diagram where the cross and bar state switching curves are approximately in parallel with each other and with the first axis of the switching diagram corresponding to the numbers of coupling lengths, and
   at least three pairs of reverse $\Delta\beta$ electrodes in the coupling region for switching said first and second optical waveguides to a cross state in response to a cross state voltage and a bar state in response to a bar state voltage.

45. A method of fabricating an optical switching array of directional couplers capable of operation with uniform cross and bar state voltages at low crosstalk levels comprising the steps of:
   fabricating first and second waveguide patterns for each of the directional couplers in the array on a substrate of electro-optic material using suitable thin film deposition techniques and photolithography, diffusing a metal dopant into the substrate of electro-optic material for each of said first and second waveguide patterns to form first and second waveguides for each of the directional couplers in the array, said first and second waveguides being closely disposed to each other in a coupling region having a number of coupling lengths selected from a switching diagram having cross and bar state switching curves, said switching diagram having a first axis corresponding to numbers of coupling lengths and a second axis proportional to cross and bar state voltages, said number of coupling lengths selected from a region of the switching diagram where the cross and bar state switching curves are approximately in parallel with each other and with the first axis of the switching diagram corresponding to the numbers of coupling lengths, and fabricating three or more sections of reverse $\Delta\beta$ electrodes on the substrate using suitable thin film deposition techniques and photolithography, said electrodes positioned in the coupling region of each of the couplers in the array for switching said first and second waveguides to a cross state in response to a cross state voltage and a bar state in response to a bar state voltage.

46. The method of claim 45, wherein the step of fabricating the waveguide patterns on the substrate includes the steps of:

depositing a layer of photosensitive material on said substrate, placing a waveguide mask over the photosensitive layer, said mask defining said first and second waveguide patterns for each of the directional couplers in the array, exposing the photosensitive layer on said substrate to ultraviolet light through the mask, and developing the photosensitive layer to form openings in the photosensitive layer corresponding to said first and second waveguide patterns.

47. The method of claim 46, wherein the step of diffusing the metal dopant into the substrate includes the steps of:

depositing a thin layer of metal dopant on the photosensitive layer and in the openings, applying a solvent to remove the metal dopant on the photosensitive layer and thereby leaving patterns of the metal dopant in the openings corresponding to said first and second waveguide patterns, and diffusing said waveguide patterns into the substrate to form said first and second waveguides for each directional coupler in the array.

48. The method of claim 47, wherein the metal dopant is titanium.

49. The method of claim 45, wherein the method further includes the step of depositing a dielectric layer on the substrate before fabricating the electrodes.

50. The method of claim 49, wherein the dielectric layer is $SiO_2$.

51. A method of fabricating an optical switching array of directional couplers capable of operation with uniform cross and bar state voltages at low crosstalk levels comprising the steps of:

fabricating first and second waveguide patterns for each of the directional couplers in the array on a substrate of electro-optic material using suitable thin film deposition techniques and photolithography, diffusing a metal dopant into the substrate of electro-optic material for each of said first and second waveguide patterns to form first and second waveguides for each of the directional couplers in the array, said first and second waveguides being closely disposed to each other in a coupling region having a number of coupling lengths, said number of coupling lengths selected from a region of corresponding process sensitivity plots, having cross and bar state voltage curves, where the cross and bar state voltage curves are both of approximately zero slope, and fabricating three or more sections of reverse $\Delta\beta$ electrodes on the substrate using suitable thin film deposition techniques and photolithography, said electrodes positioned in the coupling region of each of the couplers in the array for switching said first and second waveguides to a cross state in response to a cross state voltage and a bar state in response to a bar state voltage.

52. The method of claim 51, wherein the step of fabricating the waveguide patterns on the substrate includes the steps of:

depositing a layer of photosensitive material on said substrate, placing a waveguide mask over the photosensitive layer, said mask defining said first and second waveguide patterns for each of the directional couplers in the array, exposing the photosensitive layer on said substrate to ultraviolet light through the mask, and developing the photosensitive layer to form openings in the photosensitive layer corresponding to said first and second waveguide patterns.

53. The method of claim 52, wherein the step of diffusing the metal dopant into the substrate includes the steps of:

depositing a thin layer of metal dopant on the photosensitive layer and in the openings, applying a solvent to remove the metal dopant on the photosensitive layer and thereby leaving patterns of the metal dopant in the openings corresponding to said first and second waveguide patterns, and diffusing said waveguide patterns into the substrate to form said first and second waveguides for each directional coupler in the array.

54. The method of claim 53, wherein the metal dopant is titanium.

55. The method of claim 51, wherein the method further includes the step of depositing a dielectric layer on the substrate before fabricating the electrodes.

56. The method of claim 55, wherein the dielectric layer is $SiO_2$.

57. A method of fabricating an optical switching array of directional couplers capable of operation with uniform cross and bar state voltages at low crosstalk levels comprising the steps of:

fabricating first and second waveguide patterns for each of the directional couplers in the array on a substrate of electro-optic material using suitable thin film deposition techniques and photolithography, forming first and second waveguides for each of the directional couplers in the array by an ion-exchange process for each of said first and second waveguide patterns, said first and second waveguides being closely disposed to each other in a coupling region having a number of coupling lengths selected from a switching diagram having cross and bar state switching curves, said switching diagram having a first axis corresponding to numbers of coupling lengths and a second axis proportional to cross and bar state voltages, said number of coupling lengths selected from a region of the switching diagram where the cross and bar state switching curves are approximately in parallel with each other and with the first axis of the switching diagram corresponding to the numbers of coupling lengths, and fabricating three or more sections of reverse $\Delta\beta$ electrodes on said substrate using suitable thin film deposition techniques and photolithography, said electrodes positioned in the coupling region of each of the couplers in the array for switching said cross and second waveguides to a cross state in response to a cross state voltage and a bar state in response to a bar state voltage.

58. The method of claim 57, wherein the step of fabricating the waveguide patterns on the substrate includes the steps of:

depositing a layer of photosensitive material on said substrate, placing a waveguide mask over the photosensitive layer, said mask defining said first and second waveguide patterns for each of the directional couplers in the array, exposing the photosensitive layer on said substrate to ultraviolet light through the mask, and developing the photosensitive layer to form said first and second waveguide patterns for each of the directional couplers in the array.

59. The method of claim 58, wherein the step of forming said first and second waveguides by an ion-exchange process includes the steps of:

depositing a metal layer on the substrate and on the photosensitive layer corresponding to said first and second waveguide patterns;

removing the photosensitive layer corresponding to said first and second waveguide patterns and the metal layer thereon; and placing the substrate in benzoic acid, at 250° C., for a few hours.

60. The method of claim 59, wherein the metal layer is Au.

61. A method of fabricating an optical switching array of directional couplers capable of operation with uniform cross and bar state voltages at low crosstalk levels comprising the steps of:

fabricating first and second waveguide patterns for each of the directional couplers in the array on a substrate of electro-optic material using suitable thin film deposition techniques and photolithography, forming first and second waveguides for each of the directional couplers in the array by an ion-exchange process for each of said first and second waveguide patterns, said first and second waveguides being closely disposed to each other in a coupling region having a number of coupling lengths, said number of coupling lengths selected from a region of corresponding process sensitivity plots, having cross and bar state voltage curves, where the cross and bar state voltage curves are both of approximately zero slope, and fabricating three or more sections of reverse $\Delta\beta$ electrodes on said substrate using suitable thin film deposition techniques and photolithography, said electrodes positioned in the coupling region of each of the couplers in the array for switching said cross and second waveguides to a cross state in response to a cross state voltage and a bar state in response to a bar state voltage.

62. The method of claim 61, wherein the step of fabricating the waveguide patterns on the substrate includes the steps of:

depositing a layer of photosensitive material on said substrate, placing a waveguide mask over the photosensitive layer, said mask defining said first and second waveguide patterns for each of the directional couplers in the array, exposing the photosensitive layer on said substrate to ultraviolet light through the mask, and developing the photosensitive layer to form said first and second waveguide patterns for each of the directional couplers in the array.

63. The method of claim 62, wherein the step of forming said first and second waveguides by an ion-exchange process includes the steps of:

depositing a metal layer on the substrate and on the photosensitive layer corresponding to said first and second waveguide patterns;

removing the photosensitive layer corresponding to said first and second waveguide patterns and the metal layer thereon; and placing the substrate in benzoic acid, at 250° C., for a few hours.

64. The method of claim 63, wherein the metal layer is Au.

65. A method of fabricating an optical switching array of directional couplers capable of operation with uniform cross and bar state voltages at low crosstalk levels comprising the steps of:

fabricating first and second waveguides for each of the directional couplers in the array on a substrate of electro-optic material using suitable thin film deposition techniques and photolithography, said first and second waveguides being closely disposed to each other in a coupling region having a number of coupling lengths selected from a switching diagram having cross and bar state switching curves, said switching diagram having a first axis corresponding to numbers of coupling lengths and a second axis proportional to cross and bar state voltages, said number of coupling lengths selected from a region of the switching diagram where the cross and bar state switching curves are approximately in parallel with each other and with the first axis of the switching diagram corresponding to the numbers of coupling lengths, and fabricating three or more sections of reverse $\Delta\beta$ electrodes on the substrate using suitable thin film deposition techniques and photolithography, said electrodes positioned in the coupling region of each of the couplers in the array for switching said first and second waveguides to a cross state in response to a cross state voltage and a bar state in response to a bar state voltage.

66. The method of claim 65, wherein the step of fabricating the first and second waveguides on the substrate includes the steps of:

depositing one or more layers of semiconductor material on said substrate, placing a waveguide mask over the semiconductor layers, said mask defining said first and second waveguides for each of the directional couples in the array, exposing said semiconductor layers on said substrate to ultraviolet light through the mask, and developing the semiconductor layers to form said first and second waveguides.

67. The method of claim 65, wherein the semiconductor layers comprise InGaAsP/InP heterostructures.

68. A method of fabricating an optical switching array of directional couplers capable of operation with uniform cross and bar state voltages at low crosstalk levels comprising the steps of:

fabricating first and second waveguides for each of the directional couplers in the array on a substrate of electro-optic material using suitable thin film deposition techniques and photolithography, said first and second waveguides being closely disposed to each other in a coupling region having a number of coupling lengths, said number of coupling lengths selected from a region of corresponding process sensitivity plots, having cross and bar state voltage curves, where the cross and bar state voltage curves are both of approximately zero slope, and fabricating three or more sections of reverse $\Delta\beta$ electrodes on the substrate using suitable thin film deposition techniques and photolithography, said electrodes positioned in the coupling region of each of the couplers in the array for switching said first and second waveguides to a cross state in response to a cross state voltage and a bar state in response to a bar state voltage.

69. The method of claim 68, wherein the step of fabricating the first and second waveguides on the substrate includes the steps of:

depositing one or more layers of semiconductor material on said substrate, placing a waveguide mask over the semiconductor layers, said mask defining said first and second waveguides for each of the directional couples in the array, exposing said semiconductor layers on said substrate to ultraviolet light through the mask, and developing the semiconductor layers to form said first and second waveguides.

70. The method of claim 68, wherein the semiconductor layers comprise InGaAsP/InP heterostructures.

* * * * *